United States Patent [19]

Inouye, deceased et al.

[11] 4,133,603
[45] Jan. 9, 1979

[54] EXTRA HAND MAGNIFYING GLASS

[76] Inventors: Hajime Inouye, deceased, late of Seattle, Wash.; by Mika Inouye, executrix, 3722 E. John St., Seattle, Wash. 98122

[21] Appl. No.: 800,239

[22] Filed: May 25, 1977

[51] Int. Cl.² ............................................. G02B 7/02
[52] U.S. Cl. .................................................... 350/248
[58] Field of Search ............... 350/243, 244, 245, 248, 350/258, 298, 98; D16/54

[56] References Cited

U.S. PATENT DOCUMENTS

| D. 218,537 | 8/1970 | Bushon | D16/54 |
|---|---|---|---|
| 2,172,597 | 9/1939 | Simpson | 350/243 |
| 3,428,286 | 2/1969 | Del Pesco | 350/248 X |
| 3,512,875 | 5/1970 | Viollet | 350/243 |

FOREIGN PATENT DOCUMENTS 529738  12/1921  France ..................... 350/248

Primary Examiner—F. L. Evans
Attorney, Agent, or Firm—Roy E. Mattern, Jr.

[57] ABSTRACT

A small magnifying glass is secured to an edge encompassing surrounding portion of a frame, which integrally continues on beyond the magnifying glass in serrated apart opposite hand extending supports to create an adjustable thumb or finger surrounding portion. This finger portion of the frame is preceded and followed by openings which are also formed by the opposite hand extending supports to create a laterally compressible and expandable resilient thumb or finger mountable overall supporting frame of this extra hand magnifying glass.

1 Claim, 4 Drawing Figures

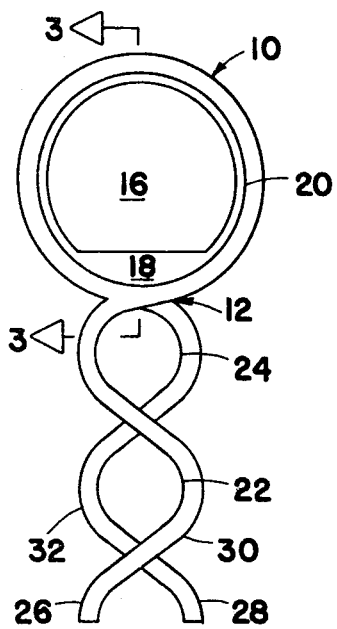
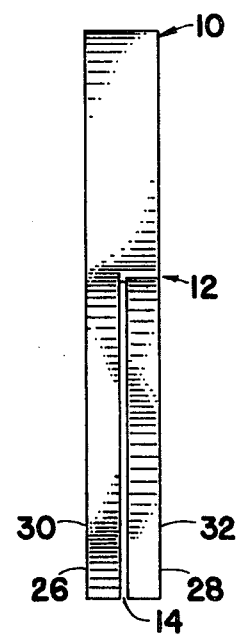
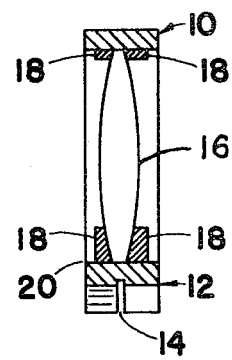
FIG. 1　　FIG. 2　　FIG. 3
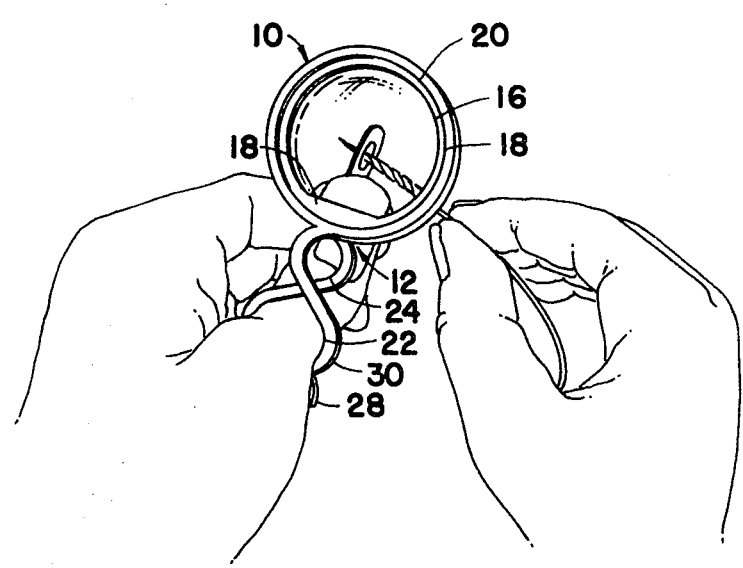
FIG. 4

EXTRA HAND MAGNIFYING GLASS

BACKGROUND OF THE INVENTION

Previously other persons have provided magnifying glasses which are surrounded by edge encompassing frames, and the frames, in turn, are equipped with additional components, which are formed to removably receive thumb and/or finger portions. J. B. Porter in 1901, in his U.S. Pat. No. 652,179 had an additional component formed as a thimble to which the magnifying glass was secured. In 1912, John Hampson, as shown in his U.S. Pat. No. 1,025,057, clamped to his thumb a support which extended a short distance to the edge encompassing frame of a magnifying glass. In 1925, Carl Wiseman, combined a finger surrounding ring with a reading or magnifying glass. Paul Carlton in 1937 in his U.S. Pat. No. 2,100,239 illustrates and describes a magnifying glass supported on a thumb by using a sleeve from which an accordian like extension frame is moved in and out to position the magnifying glass.

Although these finger or thumb mounted magnifying glasses were helpful to those needing such a finger or thumb supported magnifying glass during their sewing and/or reading periods, there still remained a need for a lower cost finger or thumb mounted magnifying glass which would more comfortably be resiliently mounted on either the forefinger or the thumb.

SUMMARY OF THE INVENTION

There is often a need for having a magnifying glass to assist one in sewing and/or reading. In regard to sewing not only is there a need to have a magnifying glass but there is a need for having one which is mountable on one's finger or thumb without withdrawing the finger or thumb from its active participation in the sewing operations. In the past this has been done, for example, by John Hampson, as set forth in his U.S. Pat. No. 1,025,057. However, his magnifying glass and others shown in prior patents have comparatively been higher in cost and less convenient to use than the magnifying glass herein illustrated and described.

In an original one piece planar plastic part, a magnifying glass is retained by adhesives about its periphery. Depending from the mounting place of the magnifying glass, this original one piece planar plastic part comprises two opposite hand portions, split apart for most of their length, and designed to resiliently fit around a portion on one's thumb or finger. By compressing their extreme crossover ends together, a thumb and/or finger receiving portion, located just above them, is enlarged. Upon release of these extreme crossover ends, the two opposite hand portions of the depending portions of the original one piece planar plastic part resiliently move back to comfortably grip the thumb or finger. The ease of such resilient flexure is enhanced by the opposite hand sine wave design of these depending portions which create, extending from the magnifying glass to the extreme crossover ends, two circular openings. The first opening helps in creating the flexure needed. The second opening likewise helps and also serves to receive the thumb or finger.

This original one piece planar plastic part is made by using high production plastic part fabrication machinery, thereby helping to keep the product costs down. Furthermore, the subsequently fully fabricated product, i.e. this one piece planar plastic part plus the magnifying glass, is compactly arranged for very convenient use, storage and shipment.

DESCRIPTION OF THE DRAWINGS

A preferred embodiment of the extra hand magnifying glass is illustrated in the drawings, wherein:
 FIG. 1 is a front view;
 FIG. 2 is a side view, both side views being almost similar;
 FIG. 3 is a cross section taken along line 3—3 of FIG. 1; and
 FIG. 4 is a perspective view of the extra hand magnifying glass being used during a needle threading operation in preparation for sewing operations during which it will also be used.

DESCRIPTION OF THE PREFERRED EMBODIMENT

The extra hand magnifying glass assembly 10, as illustrated by itself in FIGS. 1 and 2, and as shown in use in FIG. 4, conveniently presents a magnifying glass where it is needed nearby the printed word or the sewing operations. It does so in a coplanar arrangement 10, which is conveniently handled and comfortably placed on a person's thumb or finger. Moreover, by plastic product production machinery, the one piece body portion 12 is comparatively made very inexpensively in reference to the production of earlier magnifying glass assemblies. Following the first forming step, the one piece body 12, during a second step is split at its center, as viewed from the side, to form a space 14 throughout a portion of its length. Then in a third step a magnifying glass 16 is installed being held in place by a structural-like adhesive 18 distributed about each side of the magnifying glass 16 where it is fitted to the one piece body 12.

To create a first receiving circular structure 20, to receive the magnifying glass 16, and to create a second receiving circular structure 22, to receive the thumb or forefinger of the user, and, moreover, to acquire the resiliency required to be able to receive and to hold a thumb or forefinger, the entire one piece body 12 is integrally composed of circular and/or sine wave designed portions, additionally being inclusive of a flexure circular structure 24 located between the first and second receiving circular structures 20, 22, and two extreme crossover ends 26, 28 forming the commencement of an uncompleted fourth circle. The crossover ends 26, 28 are used in applying a compressive force which deflects and thereby separates other split apart portions 30, 32 of the one piece body, whereby the second receiving circular structure 22 becomes larger to accept the thumb or finger of the user. Thereafter upon release of the extreme crossover ends 26, 28, this second receiving circular structure 22 tends to return to its undeflected configuration and thereby the one piece body 12, and consequently, the extra hand magnifying glass assembly, is comfortably and firmly held on the user's thumb or finger.

What is claimed is:
1. An extra hand magnifying glass assembly resiliently, compressibly and comfortably supportable on a person's thumb or finger to provide a magnifying glass to be used during reading and sewing, comprising:
 (a) a magnifying glass;
 (b) a one piece body arranged in one geometric plane and made of moldable resilient plastic material, comprising, in turn:

(1) a completely surrounding edge receiving structure at the top to fully receive the entire peripheral edge structure of the magnifying glass;

(2) a set of depending opposite hand multiple curved structures, each at their tops being integral with the completely surrounding edge receiving structure and depending therefrom and being spaced apart from one another, their multiple curved structures being formed first below the magnifying glass, to create together a resulting small flexible circular opening, second, below this small flexible circular opening, to create together a resulting larger flexible circular opening to resiliently, compressibly, and comfortably receive a person's thumb or finger, and third below this larger flexible circular opening receiving a thumb or finger, to create a crossover lever arms to which a compressive force is applied to move the crossover lever arms together and thereby to relatively move the set of depending opposite hand multiple curved structures temporarily enlarging the second larger flexible circular opening to receive and thereafter to close comfortably around a person's thumb or finger, and (c) a means to hold the magnifying glass within the completely surrounding edge receiving structure at the top of the one piece body.

* * * * *